United States Patent
Rubio

(10) Patent No.: US 9,948,730 B2
(45) Date of Patent: Apr. 17, 2018

(54) SOCIAL NETWORK SYSTEM WITH ACCESS PROVISION MECHANISM AND METHOD OF OPERATION THEREOF

(75) Inventor: Ramon Rubio, Rossmoor, CA (US)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 664 days.

(21) Appl. No.: 13/151,220

(22) Filed: Jun. 1, 2011

(65) Prior Publication Data

US 2012/0204233 A1    Aug. 9, 2012

Related U.S. Application Data

(60) Provisional application No. 61/440,830, filed on Feb. 8, 2011.

(51) Int. Cl.
*H04L 29/08* (2006.01)
*H04L 29/06* (2006.01)

(52) U.S. Cl.
CPC ............ *H04L 67/16* (2013.01); *H04L 63/102* (2013.01)

(58) Field of Classification Search
CPC .... H04L 12/588; H04L 51/32; H04L 49/3036
USPC ....... 726/4, 15; 709/207, 218, 224, 225, 229
See application file for complete search history.

(56) References Cited

U.S. PATENT DOCUMENTS

| | | | |
|---|---|---|---|
| 6,240,456 B1 * | 5/2001 | Teng et al. | 709/230 |
| 7,511,837 B1 * | 3/2009 | Miyachi et al. | 358/1.15 |
| 8,054,485 B2 | 11/2011 | Berglin | |
| 2002/0124053 A1 | 9/2002 | Adams et al. | |
| 2004/0196486 A1 * | 10/2004 | Uchino | 358/1.14 |
| 2007/0214264 A1 | 9/2007 | Koister | |
| 2008/0155078 A1 | 6/2008 | Parkkinen et al. | |
| 2008/0252910 A1 * | 10/2008 | Cordesses et al. | 358/1.1 |
| 2010/0077048 A1 | 3/2010 | Czyzewicz et al. | |
| 2010/0114788 A1 | 5/2010 | White et al. | |
| 2010/0309508 A1 * | 12/2010 | Kamath et al. | 358/1.15 |
| 2010/0318613 A1 | 12/2010 | Souza et al. | |
| 2011/0090529 A1 * | 4/2011 | Hertling | 358/1.15 |
| 2011/0161478 A1 * | 6/2011 | Formo et al. | 709/223 |

FOREIGN PATENT DOCUMENTS

| | | |
|---|---|---|
| KR | 10-2005-0026731 | 3/2005 |
| KR | 10-2005-0083840 | 8/2005 |

OTHER PUBLICATIONS

European Search Report for Application No. 11193345.3 dated Feb. 7, 2012.
Korean Notice of Allowance dated Sep. 1, 2017 in corresponding Korean Patent Application No. 10-2011-0134459.

* cited by examiner

*Primary Examiner* — Ellen Tran
(74) *Attorney, Agent, or Firm* — Staas & Halsey LLP

(57) ABSTRACT

A method of operation of a social network system includes: receiving a service request for accessing a peripheral device revealed through a social graph of a social platform; determining a request type for matching the service request to a device service provided by the peripheral device; authorizing the device service through the social graph for accessing the peripheral device; and generating a service command based on the request type of the device service authorized for executing the device service for the peripheral device.

22 Claims, 6 Drawing Sheets

ND METHOD
SOCIAL NETWORK SYSTEM WITH ACCESS PROVISION MECHANISM AND METHOD OF OPERATION THEREOF

CROSS-REFERENCE TO RELATED APPLICATION(S)

This application claims the benefit of U.S. Provisional Patent Application Ser. No. 61/440,830 filed Feb. 8, 2011 and the subject matter thereof is incorporated herein by reference thereto.

TECHNICAL FIELD

The present invention relates generally to a network system, and more particularly to a system for a social network.

BACKGROUND ART

A social network is a social structure made up of individuals or organizations called "nodes", which are tied by one or more specific types of interdependency of relationships. Social network analysis (SNA) is the mapping and measuring of relationships and flows between people, groups, organizations, computers, URLs, electronic devices, and other connected information/knowledge entities. The nodes in the network are the people and groups while the links show relationships or flows between the nodes. SNA provides both a visual and a mathematical analysis of human relationships.

To understand networks and their participants, we evaluate the location of actors in the network. Measuring the network location is finding the centrality of a node. These measures give us insight into the various roles and groupings in a network—who are the connectors, mavens, leaders, bridges, isolates, where are the clusters and who is in them, who is in the core of the network, and who is on the periphery?

However, a social network system without has become a paramount concern for the consumer. The inability decreases the benefit of using the tool.

Thus, a need still remains for a social network system. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a social network system including: receiving a service request for accessing a peripheral device revealed through a social graph of a social platform; determining a request type for matching a service request to a device service; authorizing the device service through the social graph for accessing the peripheral device; and generating a service command based on the request type of the device service authorized for executing the device service for the peripheral device.

The present invention provides a social network system, including: a first communication unit for receiving a service request for accessing a peripheral device revealed through a social graph of a social platform; a request processor module, coupled to the first communication unit, for determining a request type for matching a service request to a device service provided by the peripheral device; an authorization module, coupled to the request processor module, for authorizing the device service through the social graph for accessing the peripheral device; and an execution module, coupled to the authorization module, for generating a service command based on the request type of the device service authorized for executing the device service for the peripheral device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
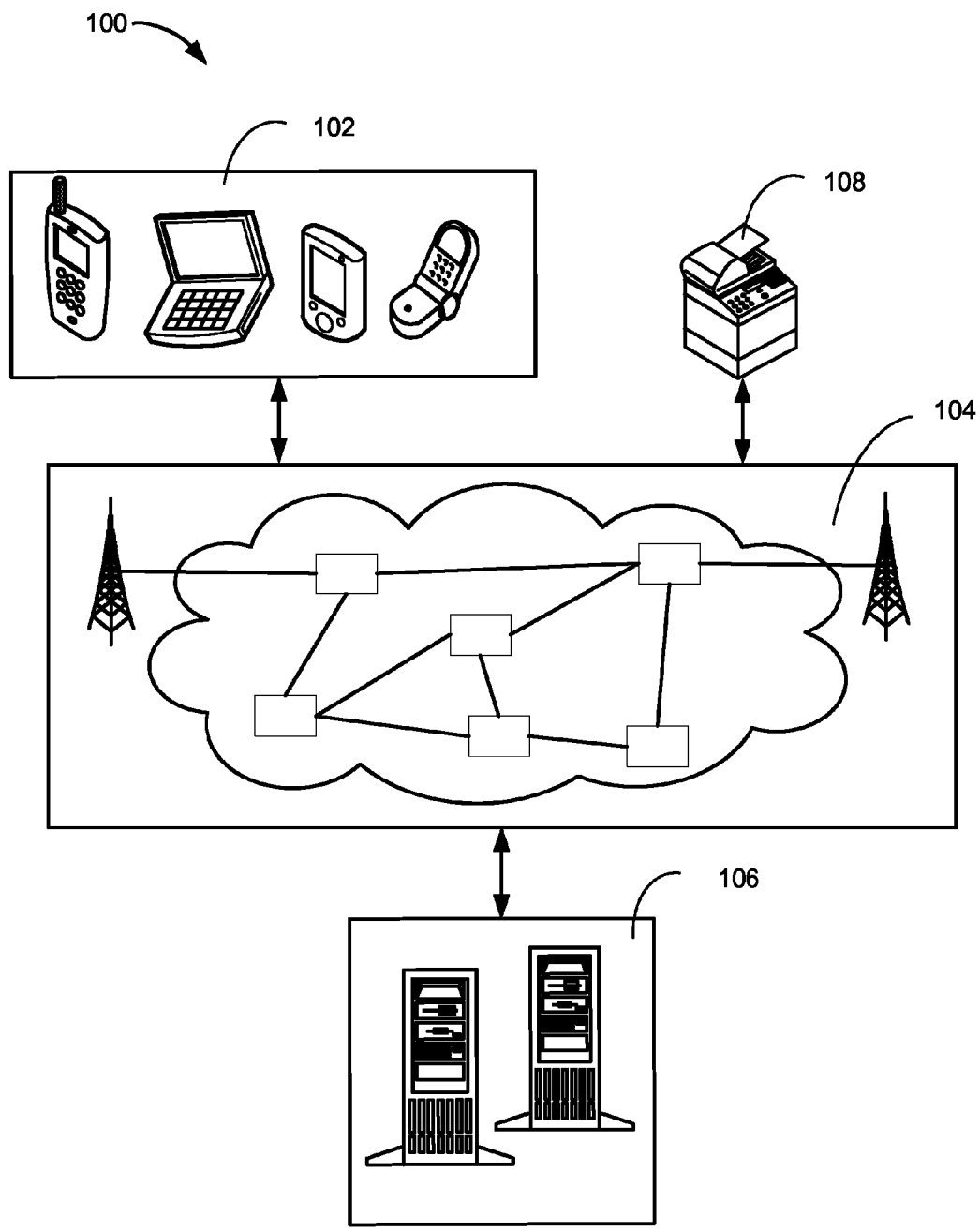
FIG. 1 is a network topology of a social network system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals.

The term communication means transfer of information between software and software, hardware and hardware, software and hardware, or a combination thereof. The term communication also means transfer of information between a user, such as a human being, and a network attached device selected by the user.

The term "module" referred to herein includes software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system, passive devices, or a combination thereof.

Referring now to FIG. 1, therein is shown a network topology of a social network system 100 in an embodiment of the present invention. The network operations diagram of the social network system 100 depicts a user in a mobile environment having access to devices and services at remote locations, such as home or office, through the social network. The social network system 100 includes a first device 102, such as a mobile device, connected to a second device 106, such as a server, with a communication path 104, such as a wireless or wired network. The first device 102 is defined as a device used to communicate with the social network system 100 to request the service provided by the present invention. The second device 106 is defined as a device that receives the request made by the first device 102 and communicates with a third device 108 to meet the request made by the first device 102. The social network system 100 also includes the third device 108, such as a multifunctional peripheral (MFP), connected to the second device 106 via the communication path 104. The third device 108 is defined as a device that provides the service requested by the first device 102. The MFP is defined as an electronic device having the functionality for variety of services, such as printing, scanning, photocopying, faxing, emailing, or a combination thereof.

For example, the first device 102 can be of any of a variety of mobile devices, such as a cellular phone, personal digital assistant, a notebook computer, printers or other multifunctional communication or entertainment device. For another example, the first device 102 can also be a non-mobile computing device, such as a server, a server farm, or a desktop computer. The first device 102 can couple to the communication path 104 to communicate with the second device 106.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The first device 102 can couple to the communication path 104 to communicate with the second device 106 to communicate with the third device 108.

The third device 108 can be of any of a variety of electronic devices, such as printers, fax machines, scanners, display monitors, MFPs, other multifunctional image generating electronic devices. The third device 108 can couple to the communication path 104 to communicate with the second device 106. The second device 106 can have a means for coupling with the communication path 104 to communicate with the third device 108.

For a specific example, the first device 102 can be a particularized machine, such as a portable computing device, a thin client, a notebook, a netbook, a smartphone, personal digital assistant, or a cellular phone, and as specific examples, an Apple iPhone, Palm Centro, or Moto Q Global. In another example, the second device 106 can be a particularized machine, such as a mainframe, a server, a cluster server, rack mounted server, or a blade server, or as more specific examples, an IBM System z10 Business Class mainframe or a HP ProLiant ML server. For another example, the third device 108 can be a particularized machine, such as a printer or an MFP, and as a specific examples, Samsung CLX 3175, Canon LC MF8350, or Xerox Phaser 4180MFP/N.

The communication path 104 can be a variety of networks. For example, the communication path 104 can include wireless communication, wired communication, optical, ultrasonic, or the combination thereof. Satellite communication, cellular communication, Bluetooth, Infrared Data Association standard, wireless fidelity, and worldwide interoperability for microwave access are examples of wireless communication that can be included in the communication path 104. Ethernet, digital subscriber line, fiber to the home, and plain old telephone service are examples of wired communication that can be included in the communication path 104.

Further, the communication path 104 can traverse a number of network topologies and distances. For example, the communication path 104 can include direct connection, personal area network, local area network, metropolitan area network, wide area network or any combination thereof.

Figure 2:
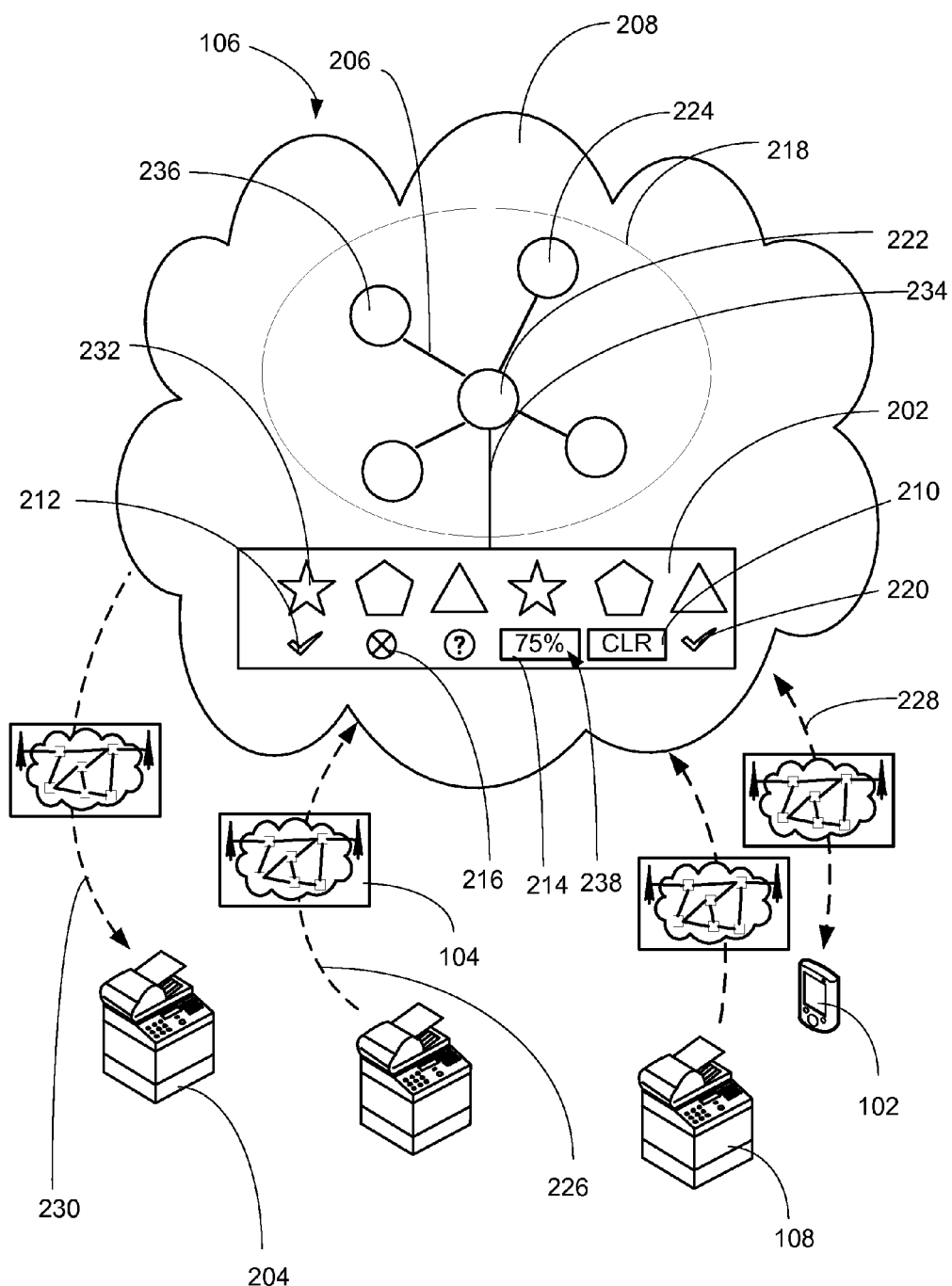
FIG. 2 is an example of accessing a device service of a peripheral device through a social graph registered to a social platform.

Referring now to FIG. 2, therein is shown an example of accessing a device service 202 of a peripheral device 204 through a social graph 206 registered to a social platform 208. The device service 202 is defined as a function of the electronic device that can be executed by running software, hardware, or a combination thereof of the electronic device, such as processing, compressing, storing, printing, communicating, displaying, or a combination thereof of digital data. The peripheral device 204 is defined as an electronic device registered to the social platform 208 that is capable of executing the device service 202. For example, the peripheral device 204 can be a variety of electronic devices, such as an MFP, printer, scanner, FAX machine, video player, audio player, or combination thereof.

The social platform 208 is defined as an online service or social network service site where the member controls the revealing of the social graph 206 of the member to at least one other member for building and reflecting the social relations amongst people, organizations, or a combination thereof.

For example, the social platform 208 can include social network service sites, such as Facebook™, MySpace™, or LinkedIn™. The second device 106 can host the social platform 208. The user of the social platform 208 can be called a member. The user can create an account with the social platform 208 to become a member. By creating an account, the member can agree to be associated with other members within the social platform 208 to build a social network or social relationship.

The social graph 206 is defined as the information about the member unavailable outside of the social platform 208 without the permission of the member that is revealed by the member to other members of the social platform 208. For example, the social graph 206 can allow the social platform 208 to establish a social relationship between the member and at least one of the other members of the social platform 208. Furthermore, the social graph 206 can permit the social network system 100 to authorize the execution of the device service 202, disclose information related to the member, or a combination thereof.

For example, the social graph 206 can include information representing "friends," "likes or dislikes," "printing service," "websites visited," "purchases," "school," or a combination thereof as the categories. For a more specific example, the characteristic of the member can be shown in details by the social graph 206 representing "friends," because the social graph 206 can show what kind of friends does the member have in the social platform 208. Details regarding the execution of the device service 202 will be discussed later.

For a more specific example, a first member of Facebook™ can establish a social relationship with a second member of Facebook™ by adding the second member as a friend. Subsequently, the social graph 206 of the first member representing "friends" can include the second member to show that the first member and the second member have a social relationship within the social platform 208 as friends.

For another example, the members of the social platform 208 can establish the social relationship by having the same type of the social graph 206 representing "school." More specifically, the first member and the second member can establish a social relationship within LinkedIn™, because both members share the social graph 206 of attending Seoul National University.

For a different example, the first device 102 can include the peripheral device 204. The peripheral device 204 can be registered to the social platform 208, and disclosed through the social graph 206 of the member for other members of the social platform 208. The social platform 208 can provide the social graph 206 representing "printing service." After the member registers the peripheral device 204 to the social platform 208, the social graph 206 representing "printing service" can indicate that the member can provide a service of printing documents.

For a specific example, the member can register the peripheral device 204 on Facebook™. After registration, Facebook™ can reveal the social graph 206 of the member representing "printing service" to indicate that the member can offer a printing service to other members of Facebook™.

The peripheral device 204 may not physically exist in the social platform 208. But rather, after the member registers the peripheral device 204, the social platform 208 and the peripheral device 204 can communicate via the communication path 104. Details regarding the registration of the peripheral device 204 will be discussed later.

For another example, the peripheral device 204 can include the third device 108. The peripheral device 204 can run software, hardware, or a combination thereof to execute the device service 202 representing, printing, faxing, scanning, displaying, or a combination thereof.

A device capability 210 is defined as an ability of the peripheral device 204. Continuing with the previous example, the MFP can have the ability to print in color, fax from MFP's storage memory, scan, display, or a combination thereof.

A device status 212 is defined as a state or condition of the peripheral device 204. For example, the device status 212 can indicate an availability 216 of the peripheral device 204, a job status 214 after executing the device service 202, or a combination thereof. For a specific example, the device status 212 of the peripheral device 204 can include that the peripheral device 204 is available for faxing but not for printing because the peripheral device 204 is out of paper.

The availability 216 is defined as a status showing whether the peripheral device 204 is ready for use or not. For example, if the availability 216 of the peripheral device 204 is "available," the peripheral device 204 can be used for printing, scanning, faxing, or a combination thereof. In contrast, if the availability 216 of the peripheral device 204 is "unavailable," the peripheral device 204 cannot be used for printing, scanning, faxing, or a combination thereof.

The job status 214 is defined as a degree of completion 238 for commencing the execution of the device service 202. For example, the device service 202 that has been executed by the peripheral device 204 can represent the printing of 1000 pages of a portable document format (PDF) file. The peripheral device 204 can include an MFP. The job status 214 can show that after 2 minutes of executing the device service 202, the peripheral device 204 had completed printing of 150 pages of the PDF file.

The degree of completion 238 is defined as the percentage expression of the job status 214. Continuing from the previous example, the job status 214 can be the completion of the printing for 150 pages out of the 1000 pages of the PDF file. The degree of completion 238 can represent 15% of completion for printing the PDF file.

A virus protection 218 is defined as a defense shield provided by the social platform 208 to block or inhibit malicious computer programs, such as a computer virus, from infecting the social platform 208. For example, the virus protection 218 can include anti-virus software, such as McAfee Antivirus™, Trend Micro Antivirus™, or Norton Antivirus™. For another example, the virus protection 218 can include firewall software, firewall hardware, or a combination thereof. For a further example, the virus protection 218 can provide defense shield for the social platform 208, the peripheral device 204, or a combination thereof. More specifically, the virus protection 218 can be installed in the social platform 208, the peripheral device 204, or a combination thereof.

An exposure 220 is defined as a vulnerability of the peripheral device 204 registered to the social platform 208 due to the availability 216 of the peripheral device 204 for accessing the device service 202. For example, by registering the peripheral device 204 to the social platform 208, the exposure 220 of the peripheral device 204 can increase the vulnerability of the peripheral device 204 to computer viruses. The vulnerability is defined as the susceptibility to attacks by malicious computer programs.

A registering member 222 of the social platform 208 can reveal the peripheral device 204 to a non-registering member 224 of the social platform 208 through the social graph 206 of the registering member 222. The registering member 222 is a member of the social platform 208 who had registered the peripheral device 204 to the social platform 208.

For example, the social graph 206 can represent "friends." The registering member 222 can also have the social graph 206 representing "printing service" to indicate that the registering member 222 had registered the peripheral device 204 for the non-registering member 224 to access the peripheral device 204 for printing documents. More specifically, the registering member 222 can reveal the peripheral device 204 through the social graph 206 to friends of the registering member 222 in the social platform 208 of his capability of printing documents.

The non-registering member 224 is a member of the social platform 208 who can desire to use the peripheral device 204 registered by the registering member 222. For example, the non-registering member 224 can include a friend of the registering member 222 in the social platform 208.

The peripheral device 204 can register or unregister itself by sending a device registration 226. The device registration 226 is defined as the request made by the peripheral device 204 whether to associate itself with the social platform 208 or not. Once the registering member 222 registers the peripheral device 204 to the social platform 208, the peripheral device 204 can register or unregister itself from the social platform 208 or can reveal or not reveal itself through the social graph 206 based on, for example, the device status 212 of the peripheral device 204.

For example, the peripheral device 204 can be out of toner. The peripheral device 204 can send the device registration 226 via the communication path 104 not to reveal itself through the social graph 206 on the social platform 208. Details regarding the registering and unregistering of the peripheral device 204 will be discussed later.

A service request 228 is a demand to access the device service 202 of the peripheral device 204 made by the non-registering member 224, another of the peripheral device 204, or a combination thereof. For example, the non-registering member 224 can send the service request 228 to access the peripheral device 204 registered by the registering member 222.

For a specific example, the non-registering member 224 can send the service request 228 representing color printing. The registering member 222 had registered the peripheral device 204 representing a color printer. If the social network system 100 authorizes the service request 228, the social platform 208 can send a service command 230 to execute the device service 202 to print out a color printing. For another example, the peripheral device 204 representing a printer can send the service request 228 to access the device service 202 of another type of the peripheral device 204 representing a fax machine to send a fax.

A request type 232 is defined as the class or category of the service request 228 which allows the social network system 100 to determine the authorization of the service command 230. For example, the request type 232 can include various types of the device service 202, such as printing, scanning, faxing, displaying, or a combination thereof. If the service request 228 requests color printing, the social network system 100 can determine that the request type 232 will be "printing." And the social network system 100 can authorize the service command 230 that executes the device service 202 in the category of "printing" for the peripheral device 204.

The service command 230 is defined as the authorization made by the registering member 222, the social network system 100, or a combination thereof to execute the device service 202 in response to the service request 228. Continuing with the previous example, the service command 230 can include authorizing the peripheral device 204 with the device capability 210 to print documents in color.

An access control 234 is defined as the ability of the registering member 222, the social network system 100, the information technology administrator (IT Admin), or a combination thereof to manage the accessibility of the peripheral device 204 by the registering member 222, the non-registering member 224, the peripheral device 204, or a combination thereof. For example, the registering member 222 can set the access control 234 for one of the non-registering member 224 as printing only. For another example, the social network system 100 can set the access control 234 of another of the non-registering member 224 as faxing only.

A permission group 236 is defined as a classification of the non-registering member 224, another of the peripheral device 204, or a combination thereof based on the access control 234 to manage the accessibility of the peripheral device 204 by the non-registering member 224, another of the peripheral device 204, or a combination thereof. For example, the social graph 206 can include "acquaintances." The social network system 100 can generate the permission group 236 for the members who are the non-registering member 224. Furthermore, the permission group 236 can include the non-registering member 224 who are associated with the registering member 222 via the social graph 206 representing "acquaintances." The social network system 100 can grant the permission group 236 with the authorization to access the peripheral device 204 for faxing only. By classifying the non-registering member 224 who are "acquaintances," the social network system 100 can limit the access control 234 to faxing only for the accessibility of the peripheral device 204 by the non-registering member 224.

Figure 3:
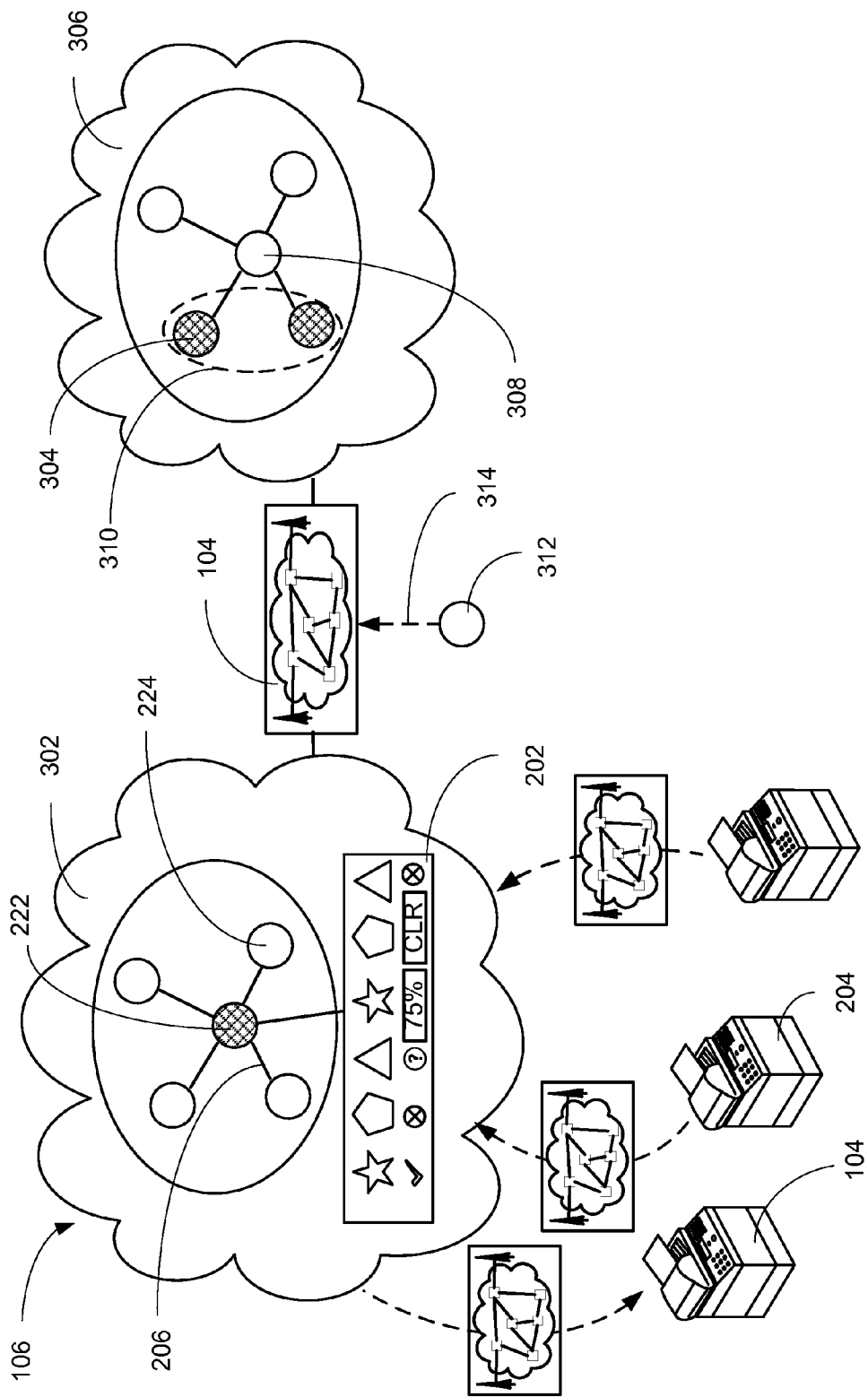
FIG. 3 is an example of accessing the device service of the peripheral device registered to a supported social platform by an unsupported member of an unsupported social platform.

Referring now to FIG. 3, therein is shown an example of accessing the device service 202 of the peripheral device 204 registered to a supported social platform 302 by an unsupported member 304 of an unsupported social platform 306. The supported social platform 302 is defined as the social platform 208 of FIG. 2 where the registering member 222 had registered the peripheral device 204 to the social platform 208. The second device 106 can host the supported social platform 302.

For example, the peripheral device 204 can include an MFP. The social graph 206 can include "printing service." The registering member 222 can register the MFP and reveal the MFP through the social graph 206 representing "printing service." The social platform 208 can become the supported social platform 302 after the registering member 222 registered the peripheral device 204 to the social platform 208. The supported social platform 302 can support the execution of the device service 202 of the peripheral device 204 representing printing after the peripheral device 204 has been registered.

The unsupported social platform 306 is defined as the social platform 208 where the peripheral device 204 had not been registered by the registering member 222. For example, the registering member 222 can include a member of Facebook™ and LinkedIn™. Facebook™ can represent the supported social platform 302, because the registering member 222 registered the peripheral device 204 to Facebook™.

However, although the registering member 222 is the member of LinkedIn™, the registering member 222 did not register the peripheral device 204 for LinkedIn™. LinkedIn™ can represent the unsupported social platform 306.

The unsupported member 304 is defined as the non-registering member 224 who is both a member of the unsupported social platform 306 and who had not registered the peripheral device 204. Continuing with the previous example, a member of LinkedIn™ who had neither registered the peripheral device 204 in Facebook™ nor LinkedIn™ can represent the unsupported member 304.

A supported member 308 is defined as the registering member 222 who is a member of the unsupported social platform 306. For example, the supported member 308 can represent the registering member 222 who had registered the peripheral device 204 to Facebook™. However, the supported member 308 can represent the same member as the registering member 222 who had registered the peripheral device 204 to Facebook™, but may not have registered the peripheral device 204 to LinkedIn™.

The social network system 100 can generate an access combination 310 to authorize the unsupported member 304 to access the peripheral device 204 registered to the supported social platform 302. The access combination 310 is defined as the grouping of the members from various types of the social platform 208 established based on the Boolean logic. The Boolean Logic is defined as an algebraic operation that includes conjunction, disjunction, negation, or a combination thereof. For example, the grouping based on the Boolean Logic can be a Boolean combination. The access combination 310 can be the Boolean combination.

For a specific example, the access combination 310 can represent the grouping of members from Facebook™ and LinkedIn™. The members of Facebook™ and LinkedIn™ can be grouped together based on the social graph 206 shared by the members.

For a more specific example, Facebook™ can represent the supported social platform 302 and LinkedIn™ can represent the unsupported social platform 306. The supported member 308 of LinkedIn™, who is also the registering member 222 of Facebook™, can reveal the peripheral device 204 through the social graph 206 of Facebook™. The non-registering member 224 of Facebook™, who is associated with the registering member 222 through the social graph 206 representing "school," can be authorized to access the peripheral device 204 registered by the registering member 222.

The social network system 100 can generate the access combination 310 to reveal the peripheral device 204 registered in Facebook™ in LinkedIn™. For a more specific example, the social network system 100 can generate the access combination 310 by grouping the members from both Facebook™ and LinkedIn™ whom are associated with the registering member 222 or the supported member 308 through the social graph 206 of "school."

As discussed previously, the non-registering member 224 can access the peripheral device 204 revealed through the social graph 206 by the registering member 222 in Facebook™. After the social network system 100 generates the access combination 310 by grouping the unsupported member 304 and the non-registering member 224, the social network system 100 can reveal the peripheral device 204 to the unsupported member 304 to access the peripheral device 204 in LinkedIn™. Details regarding the generation of the access combination 310 will be discussed later.

A nonmember 312 is defined as an individual who is unassociated with the social platform 208. For example, the nonmember 312 is not a member for Facebook™, LinkedIn™, or MySpace™. The social network system 100 can publish the peripheral device 204 registered to the social platform 208 to the nonmember 312. Details regarding the publishing of the peripheral device 204 to the nonmember 312 will be discussed later.

The nonmember 312 can send a social request 314 via the communication path 104 to the social platform 208 to establish a social relationship within the social platform 208 with the registering member 222. The social request 314 is defined as a request made by the nonmember 312 to the registering member 222 to establish a social relationship within the social platform 208.

For example, the social request 314 can represent a "friend request" to be associated as a friend. For another example, the social request 314 can represent a onetime association between the registering member 222 and the nonmember 312 so that the nonmember 312 can access the peripheral device 204 registered to the social platform 208.

Figure 4:
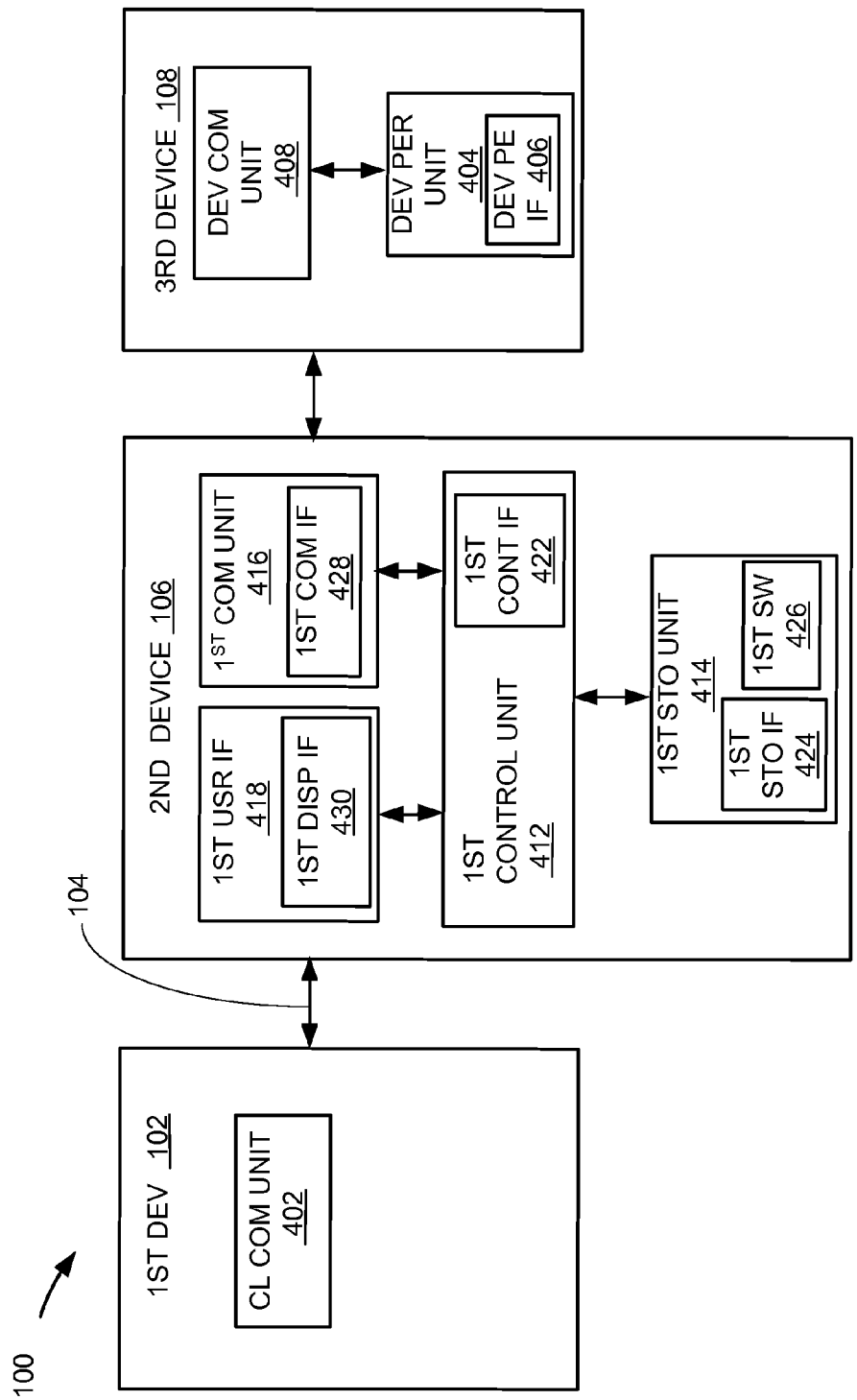
FIG. 4 is an exemplary block diagram of the social network system.

Referring now to FIG. 4, therein is shown an exemplary block diagram of the social network system 100. The social network system 100 can include the first device 102, the communication path 104, the second device 106, and the third device 108. The first device 102 can send information over the communication path 104 to the second device 106. The second device 106 can send information over the communication path 104 to the first device 102. The second device 106 can send information over the communication path 104 to the third device 108. The third device 108 can send information over the communication path 104 to the second device 106.

For brevity of description in this embodiment of the present invention, the first device 102 will be described as a mobile device, the second device 106 will be described as a server device, and the third device 108 will be described as the peripheral device 204 of FIG. 2. The present invention is not limited to this selection for the type of devices. The selection is an example of the present invention.

The first device 102 can include a client communication unit 402. The client communication unit 402 can enable external communication to and from the first device 102. For example, the client communication unit 402 can permit the first device 102 to communicate with the second device 106, an attachment, such as an electronic device, and the communication path 104. The client communication unit 402 can send the service request 228 of FIG. 2, the social request 314 of FIG. 3, or a combination thereof.

The second device 106 can include a first control unit 412, a first storage unit 414, a first communication unit 416, and a first user interface 418. The first control unit 412 can include a first control interface 422. The first control unit 412 can execute a first software 426 to provide the intelligence of the social network system 100. The intelligence of the social network system 100 is defined as the ability to execute the modules of the social network system 100. The first control unit 412 can be implemented in a number of different manners. For example, the first control unit 412 can include a processor, an embedded processor, a microprocessor, a hardware control logic, a hardware finite state machine, a digital signal processor, or a combination thereof. The first control interface 422 can be used for communication between the first control unit 412 and other functional units in the second device 106. The first control interface 422 can also be used for communication that is external to the second device 106.

The first control interface 422 can receive information from the other functional units or from external sources, or can transmit information to the other functional units or to external destinations. The external sources and the external destinations refer to sources and destinations external to the second device 106.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system, optical circuitry, waveguides, wireless circuitry, wireline circuitry, or a combination thereof.

The first storage unit 414 can store the first software 426. The first storage unit 414 can also store the relevant information, such as advertisements, points of interest, social network entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory, Flash memory, disk storage, or a volatile storage such as static random access memory.

The first storage unit 414 can include a first storage interface 424. The first storage interface 424 can be used for communication between other functional units in the first device 102. The first storage interface 424 can also be used for communication that is external to the second device 106.

The first storage interface 424 can receive information from the other functional units or from external sources, or can transmit information to the other functional units or to external destinations. The external sources and the external destinations refer to sources and destinations external to the second device 106.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the second device 106. For example, the first communication unit 416 can permit the first device 102 to communicate with the second device 106 and the communication path 104. For another example, the first communication unit 416 can permit the second device 106 to communicate with the third device 108 and the communication path 104.

The first communication unit 416 can also function as a communication hub allowing the second device 106 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the second device 106. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user to interface and interact with the second device 106. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the social network system 100. The first control unit 412 can also execute the first software 426 for the other functions of the social network system 100, including receiving the service request 228 of FIG. 2 from the first communication unit 416. The first control unit 412 can further execute the first software 426 for interaction with the communication path 104 via the first communication unit 416.

The third device 108 can include a device peripheral unit 404, a device peripheral interface 406, and a device communication unit 408. The device peripheral unit 404 can execute the device service 202 of FIG. 2 in response to the service command 230 of FIG. 2 requested by the social platform 208. The device peripheral unit 404 can be implemented in many ways. For example, the device peripheral unit 404 can function as a printer, fax machine, a scanner, a display monitor, or a combination thereof.

The device peripheral unit 404 can include the device peripheral interface 406. The device peripheral interface 406 can be used for communication between the device peripheral unit 404 and other functional units in the third device 108. The device peripheral interface 406 can also be used for communication that is external to the third device 108.

The device peripheral interface 406 can receive information from the other functional units or from external sources, or can transmit information to the other functional units or to external destinations. The external sources and the external destinations refer to sources and destinations external to the third device 108.

The device peripheral interface 406 can include different implementations depending on which functional units or external units are being interfaced with the device peripheral unit 404. The device peripheral interface 406 can be implemented with technologies and techniques similar to the implementation of the first control interface 422.

The device communication unit 408 can enable external communication to and from the third device 108. For example, the device communication unit 408 can permit the third device 108 to communicate with the second device 106, an attachment, such as an electronic device, and the communication path 104. The device communication unit 408 can send the device registration 226 of FIG. 2, can receive the service command 230 of FIG. 2, or a combination thereof.

Figure 5:
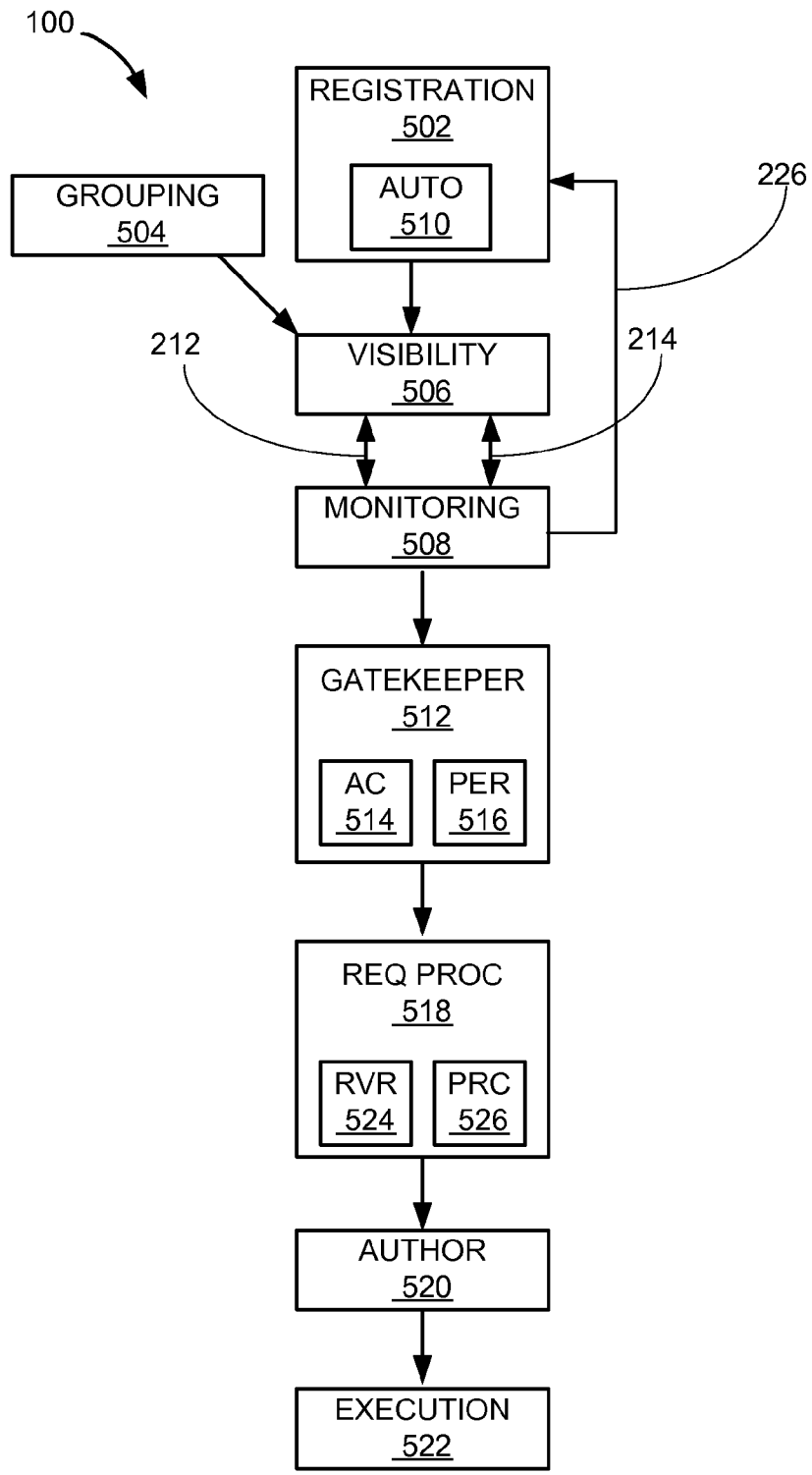
FIG. 5 is a control flow of the social network system.

Referring now to FIG. 5, therein is shown a control flow of the social network system 100. The social network system 100 can include a registration module 502. The registration module 502 registers the peripheral device 204 to the social network services. For example, the registration module 502 can register the peripheral device 204 of FIG. 2 to the social platform 208 of FIG. 2 for revealing the peripheral device 204 through the social graph 206 of FIG. 2 of the social platform 208.

The registration module 502 can register the peripheral device 204 in a number of ways. For example, the registration module 502 can register the peripheral device 204 via the application programming interface (API) of the social platform 208. For a more specific example, the registration module 502 can register the peripheral device 204 via the registration APIs provided by the social platform 208. The registration API is defined as APIs that allows registration of data, software, hardware, or a combination thereof to the social platform 208. For example, the registration module 502 can register the peripheral device 204 using the registration APIs by providing identification information, such as the uniform resource locator (URL) of the peripheral device 204.

For another example, the registration module 502 can register the peripheral device 204 via the Devices Profile for Web Services (DPWS). For a more specific example, the registration module 502 can register the type of electronic device for the peripheral device 204, the manufacturer name of the peripheral device 204, and the type of the device service 202 of FIG. 2 offered by the peripheral device 204 on the Web Services Description Language (WSDL) of the social platform 208.

For another example, the registration module 502 can register the peripheral device 204 via Universal Plug and Play (UPnP). For a more specific example, the registration module 502 can register the type of electronic device for the peripheral device 204, the manufacturer name of the peripheral device 204, and the type of the device service 202 offered by the peripheral device 204 on the UPnP description.

The registration module 502 can register the peripheral device 204 to the supported social platform 302 of FIG. 3 for revealing the peripheral device through the social graph 206 of the unsupported social platform 306 of FIG. 3 based on the access combination 310 of FIG. 3. The registration module 502 can register the peripheral device 204 to the supported social platform 302 similarly as registering the peripheral device 204 to the social platform 208 discussed above.

The social network system 100 can include a grouping module 504. The grouping module 504 groups the members from one social network service and another social network service to determine which members can access the peripheral device 204 registered on the social network service. For example, the grouping module 504 can generate the access combination 310 between the supported social platform 302 and the unsupported social platform 306.

The grouping module 504 can generate the access combination 310 in a number of ways. For example, the grouping module 504 can generate the access combination 310 based on the Boolean logic. More specifically, the grouping module 504 can generate the access combination 310 based on Boolean algebra, such as conjunction, disjunction, negation, or a combination thereof.

For example, the grouping module 504 can generate the access combination 310 based on the social graph 206 of the registering member 222 of FIG. 2 for the supported social platform 302 and the social graph 206 of the supported member 308 for the unsupported social platform 306. As illustrated in FIG. 3, Facebook™ can represent the supported social platform 302 and LinkedIn™ can represent the unsupported social platform 306. The registering member 222 can have the social graph 206 representing "Education" in Facebook™. The supported member 308 of FIG. 3, who is also the registering member 222, can have the social graph 206 representing "Education" in LinkedIn™.

The registering member 222 can reveal through the social graph 206 representing "Education" that he went to Seoul National University for both Facebook™ and LinkedIn™. The registering member 222 can have social relationships within Facebook™ and LinkedIn™ with other members of Facebook™ and LinkedIn™ whom also went to Seoul National University.

However, a member may only have a social relationship with the registering member 222 through one of the social platform 208 and not through multiple memberships from various versions of the social platform 208. For example, if a member has multiple memberships, a member can have a membership with Facebook™ and a separate membership with LinkedIn™.

For this example, the registering member 222 may have a social relationship with John Kim, a classmate from Seoul National University, within Facebook™ only. And the registering member 222 may have a social relationship with Mary Park, a classmate from Seoul National University, within LinkedIn™ only.

The grouping module 504 can generate the access combination 310 based on the conjunction operation of members of the social platform 208 with the social graph 206 representing "Education=Seoul National University" between Facebook™ and LinkedIn™. For example, the grouping module 504 can generate the access combination 310 that includes John Kim and Mary Park.

The grouping module 504 can generate the access combination 310 based on exclusive disjunction operation. For example, the registering member 222 can have social relationships with Eric Lee, an ex-coworker from International Business Machine (IBM), within Facebook™ and LinkedIn™. The grouping module 504 can generate the access combination 310 that excludes the member who is a member of both Facebook™ and LinkedIn™. Therefore, the grouping module 504 can generate the access combination 310 that excludes Eric Lee.

It has been discovered that the present invention provides the registering member 222 to control the grouping of the members from various versions of the social platform 208 whom can access the peripheral device 204. The ability to generate the access combination 310 allows the registering member 222 the flexibility and granular control over the access of the device service 202 offered by the peripheral device 204. More specifically, by generating the access combination 310, the registering member 222 can permit the access of the peripheral device 204 by registering to only one of the social platform 208 and not every type of the social platform 208.

The social network system 100 can include a visibility module 506. The visibility module 506 reveals the peripheral device 204 registered to the social network service. For example, the visibility module 506 can reveal the peripheral device 204 through the social graph 206 of the unsupported social platform 306 based on the access combination 310 for accessing the peripheral device 204 via the unsupported social platform 306.

The visibility module 506 can reveal the peripheral device 204 in a number of ways. For example, the visibility module 506 can reveal the content disclosed in one social network service in another social network service via social network aggregation. For a specific example, the registering member 222 can register the peripheral device 204 on Facebook™, the supported social platform 302. The social graph 206 of Facebook™ can reveal that the registering member 222 had registered the peripheral device 204 on Facebook™. More specifically, Facebook™ can disclose the peripheral device 204 through the social graph 206 of Facebook™ using the publication APIs that publishes the social graph 206. The publication API is defined as the API that allows the social platform 208 to disclose the social graph 206 to other members within the social platform 208, the nonmembers 312 of FIG. 3 outside of the social platform 208, or a combination thereof.

Continuing with the example, the visibility module 506 can reveal the peripheral device 204 registered in Facebook™ in LinkedIn™, the unsupported social platform 306, by connecting the social graph 206 for Facebook™ with the social graph 206 for LinkedIn™. For a specific example, the Facebook™ and LinkedIn™ can connect the social graph 206 using the socket APIs and the cross platform APIs that allow interfacing between different types of the social platform 208. The socket API is defined as the API that allows connection between the APIs of one of the social platform 208 and another of the social platform 208. The cross platform API is defined as the API that allows the communication between one of the social platform 208 with another of the social platform 208.

More specifically, the visibility module 506 can reveal the peripheral device 204 registered in Facebook™ through the social graph 206 of LinkedIn™, because the social graph 206 of Facebook™ and the social graph 206 of LinkedIn™ can be connected via the socket APIs and cross platform APIs. For example, the visibility module 506 can control the disclosure of the peripheral device 204 to the unsupported social platform 306 based on the access combination 310 for revealing the peripheral device 204 only to some of the unsupported member 304 of FIG. 3.

For another example, the unsupported social platform 306 can reveal the social graph 206 of the supported social platform 302. For a specific example, LinkedIn™ can represent the unsupported social platform 306. LinkedIn™ can utilize the Open Graph Protocol™ of Facebook™ to reveal the peripheral device 204 registered to Facebook™ through the social graph 206 of Facebook™.

For another example, the visibility module 506 can reveal the device capability 210 of FIG. 2 of the peripheral device 204 through the social graph 206. As discussed above, the social graph 206 of the supported social platform 302 or the unsupported social platform 306 can reveal the peripheral device 204 registered through the social graph 206. The visibility module 506 can reveal the device capability 210 using the publication APIs, the socket APIs, the cross platform APIs, or a combination thereof.

The social network system 100 can include a monitoring module 508. The monitoring module 508 determines whether the peripheral device 204 registered to the social network service is available. For example, the monitoring module 508 can determine the device status 212 of FIG. 2 of the peripheral device 204 for assuring the availability 216 of FIG. 2 of the peripheral device 204. For another example, the monitoring module 508 can determine the job status 214 of FIG. 2 for revealing the job status 214 through the social graph 206.

The monitoring module 508 can determine in a number of ways. For example, the monitoring module 508 can run CounThru™ 2 Pro to determine the device status 212 for assuring the availability 216 of the peripheral device 204. For a more specific example, the monitoring module 508 can determine that the peripheral device 204 is inaccessible for the reasons, such as out of paper, toner, or a combination thereof. For another example, the monitoring module 508 can determine whether the peripheral device 204 is online or offline. For a different example, the monitoring module 508 can run CounThru™ 2 Pro to determine the job status 214 representing the number of pages printed, scanned, faxed, displayed, or a combination thereof.

For illustrative purposes, the social network system 100 is shown with the visibility module 506 revealing the peripheral device 204, although it is understood that the visibility module 506 can operate differently. For example, the visibility module 506 can reveal the device status 212, the job status 214, or a combination thereof through the social graph 206 for assuring the availability 216 of the peripheral device 204.

For a more specific example, the device status 212 of the peripheral device 204 can be out of toner. The visibility module 506 can reveal the device status 212 through the social graph 206 to indicate that the device service 202 representing "printing" as unavailable. If the toner is replaced, the visibility module 506 can reveal the device status 212 through the social graph 206 for assuring the availability 216 of the peripheral device 204 as available.

For a different example, the job status 214 of the peripheral device 204 can be printing the two-hundredth page out of a five hundred page document. The visibility module 506 can reveal the job status 214 through the social graph 206 to indicate that the device service 202 representing "printing" as busy.

For illustrative purposes, the social network system 100 is shown with the monitoring module 508 determining the device status 212, the job status 214, or a combination thereof, although it is understood that the monitoring module 508 can operate differently. For example, the monitoring module 508 can send the device registration 226 to an automation module 510 for registering or unregistering the peripheral device 204 from the social platform 208.

For a more specific example, the device status 212 for the peripheral device 204 can represent offline. The monitoring module 508 can generate the device registration 226 that includes the device status 212 of offline. The automation module 510 can receive the device registration 226 for the peripheral device 204.

The registration module 502 includes the automation module 510. The automation module 510 receives the request made by the monitoring module 508. For example, the automation module 510 can receive the device registration 226 for the peripheral device 204.

For illustrative purposes, the social network system 100 is shown with the registration module 502 registering the peripheral device 204, although it is understood that the registration module 502 can operate differently. For example, the registration module 502 can register the peripheral device 204 based on the device registration 226 for determining the availability 216 of the peripheral device 204. For another example, the registration module 502 can unregister the peripheral device 204 from the social platform 208.

For a more specific example, the device registration 226 can include the device status 212 of out of paper. Based on the device registration 226, the registration module 502 can unregister the peripheral device 204 from the social platform 208 using the publication APIs, the registration APIs, or a combination thereof. Subsequently, the peripheral device 204 will not be revealed through the social graph 206, because the peripheral device 204 is unavailable for members to request the device service 202.

In contrast, if the paper is refilled, the device status 212 of the peripheral device 204 can represent available. The monitoring module 508 can send the device registration 226 that includes the device status 212 of being available to the registration module 502. Based on the device registration 226, the registration module 502 can register the peripheral device 204 back to the social platform 208. Subsequently, the peripheral device 204 can be revealed through the social graph 206 for the members to access the device service 202.

It has been discovered that the present invention provides the social network system 100 the control the availability 216 of the peripheral device 204 dynamically and automatically. The ability to register or unregister the peripheral device 204 based on the device registration 226 allows the social network system 100 to offer the peripheral device 204 that is most optimal to the non-registering member 224, the unsupported member 304, the nonmember 312, or a combination thereof. Furthermore, the dynamic and automatic registration of the peripheral device 204 to the social platform 208 can relieve the registering member 222 from manually registering the peripheral device 204, thus, improving efficiency for keeping track of the availability 216 of the peripheral device 204.

The social network system 100 can include a gatekeeper module 512. The gatekeeper module 512 controls the members who can access the peripheral device 204 registered to the social network service. For example, the gatekeeper module 512 can generate the access control 234 of FIG. 2 for managing the peripheral device 204 requested. For another example, the gatekeeper module 512 can generate the permission group 236 of FIG. 2 based on the access control 234 for controlling the availability of the peripheral device 204.

The gatekeeper module 512 includes an access module 514. The access module 514 generates the right to access the peripheral device 204. For example, the access module 514 can generate the access control 234 through the social graph 206.

The access module 514 can generate the access control 234 in a number of ways. For example, the access module 514 can generate the access control 234 by granting the non-registering member 224 of FIG. 2, the unsupported member 304 of FIG. 3, or a combination thereof, access to the peripheral device 204 following the OAuth 2.0 Protocol™. For another example, the access module 514 can generate the access control 234 by limiting the disclosure of the peripheral device 204 through the social graph 206 by changing the privacy setting of the social platform 208. The access control 234 can control the access by the non-registering member 224, the unsupported member 304, the peripheral device 204 or a combination thereof. For another example, the access module 514 can generate the access control 234 using SyncThru Web Admin Service™.

For another example, the access module 514 can generate the access control 234 based on the setting configured by the IT Admin of an enterprise, such as a company. More specifically, the peripheral device 204 can be company owned. The IT Admin can be responsible for the accessibility of the peripheral device 204. The registering member 22 can reveal the peripheral device 204 owned by the company via the social graph 206 of the registering member 222. The IT Admin can control the access to the peripheral device 204 revealed through the social graph 206 of the registering member 222 by setting the configuration for the peripheral device 204 in the access module 514. The access module 514 can generate the access control 234 based on the setting configured by the IT Admin.

For a different example, the access module 514 can generate the access control 234 by granting the permission based on the device service 202 basis. For example, the access module 514 can generate the access control 234 that limits one of the peripheral device 204, a printer, to access only the device service 202 representing "faxing" of another one of the peripheral device 204. Another one of the peripheral device 204 can represent an MFP, capable of printing, scanning, faxing, displaying, or a combination thereof. Based on the access control 234, the peripheral device 204 representing a printer can only access the device service 202 representing "faxing" of the MFP.

The gatekeeper module 512 includes a permission module 516. The permission module 516 organizes the access of the peripheral device 204 according to the level of access right granted. For example, the permission module 516 can generate the permission group 236 based on the access control 234 for controlling the availability 216 of the peripheral device 204.

Continuing with the example, the permission module 516 can generate the permission group 236 in a number of ways. For example, the permission module 516 can generate the permission group 236 based on the access control 234 for controlling the availability 216 of the peripheral device 204. More specifically, the permission module 516 can determine the access control 234 for accessing the peripheral device 204.

As discussed previously, the access control 234 can limit acquaintances to access the device service 202 for faxing only. The permission module 516 can determine the access control 234 by verifying the access control 234 granted for each of the device service 202. For example, the permission module 516 can verify that the access control 234 for acquaintances is limited to fax only.

Accordingly, the permission module 516 can generate the permission group 236 for acquaintances that can include the non-registering member 224, the unsupported member 304, the peripheral device 204, or a combination thereof with the access control 234 for faxing only. Subsequently, the members in the permission group 236 representing acquaintances can only fax from the peripheral device 204.

For a different example, the social graph 206 can represent "education=Seoul National University." More specifically, the social graph 206 can represent members who had graduated from Seoul National University in 1990. The permission module 516 can generate the permission group 236 based on the members with the social graph 206 representing the graduates of Seoul National University for year 1990.

The access control 234 for the members who had graduated from Seoul National University in 1990 can access the peripheral device 204 for printing, faxing, and scanning. The permission module 516 can determine that the access control 234 for the 1990 graduates of Seoul National University to be printing, faxing, and scanning Subsequently, the permission module 516 can generate the permission group 236 representing the graduates of Seoul National University for year 1990 with the access control 234 for printing, faxing, and scanning using the peripheral device 204.

For another example, the permission module 516 can generate different levels of the permission group 236. More specifically, the access control 234 can be complete access to all of the device service 202 of the peripheral device 204. The permission module 516 can generate the permission group 236 based on the access control 234 with a level of complete access.

In contrast, the access control 234 with an access to only one of the device service 202 of the peripheral device 204 can be designated as minimal access to the peripheral device 204. The permission module 516 can generate the permission group 236 based on the access control 234 with a level of minimal access.

The social network system 100 can include a request processor module 518. The request processor module 518 receives the request made by the user and determines the type of request made by the members who desires to access the electronic service registered to the social network service. For example, the request processor module 518 can receive the service request 228 of FIG. 2 for assessing the peripheral device 204 for revealing through the social graph 206 of the social platform 208. For another example, the request processor module 518 can determine the request type 232 of FIG. 2 for matching the service request 228 to the device service 202.

The request processor module 518 includes a receiver module 524. The receiver module 524 receives the request made by the user. For example, the receiver module 524 can receive the service request 228 for assessing the peripheral device 204 for revealing through the social graph 206 of the social platform 208. More specifically, the receiver module 524 can receive the service request 228 via the first communication unit 416 of FIG. 4.

The request processor module 518 includes a processing module 526. The processing module 526 determines the type of request made by the members. For example, the process module 526 can determine the request type 232 for matching the service request 228 to the device service 202.

The processing module 526 can determine the request type 232 in a number of ways. For example, the service request 228 can follow the Simple Object Access Protocol (SOAP). The service request 228 can include a request for duplex printing. The device service 202 can be registered to the social platform 208 via WSDL. More specifically, the WSDL can be organized by the request type 232. For example, the WSDL can organize the request type 232 by printing service, faxing service, scanning service, displaying service, or a combination thereof. The request processor module 518 can match the duplex printing requested in the service request 228 with the device service 202 registered on the WSDL to determine that the request type 232 is a printing service.

For another example, the service request 228 can represent color printing. However, color printing is not the device service 202 registered in the WSDL. If the device service 202 is not registered in the WSDL, the non-registration can represent that the peripheral device 204 does not offer the device service 202, cannot offer the device service 202, or a combination thereof. Subsequently, the request processor module 518 can determine that color printing is not the request type 232 offered by the peripheral device 204.

The social network system 100 can include an authorization module 520. The authorization module 520 authorizes the access of the peripheral device 204 registered to the social network service. For example, the authorization module 520 can authorize the device service 202 through the social graph 206 for accessing the peripheral device 204.

The authorization module 520 can authorize the device service 202 in a number of ways. For example, the authorization module 520 can authorize the device service 202 following the OAuth 2.0 Protocol™. For a specific example, the authorization module 520 can authorize the device service 202 based on the device status 212 for accessing the peripheral device 204.

The peripheral device 204 can include an MFP with the device service 202 including printing, faxing, scanning, displaying, or a combination thereof. The device status 212 can indicate that the peripheral device 204 may be out of paper for printing. The authorization module 520 can authorize the access of the device service 202 other than printing based on the device status 212 to the non-registering member 224.

For a different example, the authorization module 520 can authorize the device service 202 based on the job status 214 for accessing the peripheral device 204. The job status 214 can indicate that the peripheral device 204 is currently transmitting a document via fax, and is unavailable for another fax transmission until the first fax transmission is complete. The authorization module 520 can authorize the access of the device service 202 other than faxing based on the job status 214 to the non-registering member 224.

For another example, the authorization module 520 can authorize the device service 202 based on the registering member 222 accepting the service request 228 via the social graph 206 for executing the device service 202. More specifically, the service request 228 for the device service 202 can be made through the social graph 206 to access the peripheral device 204 revealed. Even if the service request 228 can access the peripheral device 204 through the social graph 206, the authorization module 520 can control the execution of the device service 202 based on the registering member 222 authorizing the execution of the device service 202.

For another example, the non-registering member 224 can request the device service 202 for color printing. However, the peripheral device 204 only has the device capability 210 representing black and white printing. The authorization module 520 can authorize the device service 202 based on the device capability 210 for accessing the peripheral device 204. Subsequently, the authorization module 520 can deny the request made by the non-registering member 224 for color printing.

For another example, the gatekeeper module 512 can create the permission group 236 having the access control 234 for scanning only. The non-registering member 224 in the permission group 236 can attempt to access the device service 202 representing "printing" for the peripheral device for which the non-registering member 224 is only permitted to scan. The authorization module 520 can authorize the device service 202 based on the access control 234 for managing the peripheral device 204 requested. And the authorization module 520 can authorize the device service 202 based on the permission group 236 for accessing the peripheral device 204. Subsequently, the authorization module 520 can deny the request made by the non-registering member 224 for printing.

For another example, the authorization module 520 can authorize the device service 202 through the social graph 206 of the unsupported social platform 306 for accessing the peripheral device 204. As discussed previously, the visibility module 506 can reveal the peripheral device 204 by disclosing the peripheral device 204 through the social graph 206 of the supported member 308 for the unsupported social platform 306. The unsupported member 304 can request access of the device service 202 representing "printing" for the peripheral device 204 revealed through the social graph 206. The authorization module 520 can authorize the access to the device service 202 using the OAuth 2.0 Protocol™ to permit the unsupported member 304 access the device service 202 representing "printing" for the peripheral device 204 registered to the supported social platform 302.

For another example, the authorization module 520 can execute the virus protection 218 for controlling the availability 216 of the peripheral device 204 requested by the service request 228. For a specific example, a hostile user can send the service request 228. A hostile user can represent a member of the social platform 208, the nonmember 312, or a combination thereof with the intent to cause harm to the social platform 208, the peripheral device 204, or a combination thereof. The authorization module 520 can execute the virus protection 218 to protect of the peripheral device 204 from a hostile user by executing the virus protection 218 to inhibit the hostile user from, for example, infecting the social platform 208 with a computer virus.

For a specific example, the authorization module 520 can execute the virus protection 218 representing firewall software to deny unrecognizable service request. The unrecognizable service request can include, for example, the service request 228 made by the member unauthorized by the access control 234, the member not in the permission group 236, the nonmember 312, or a combination thereof. The service request 228 made by member unauthorized by the access control 234, the member not in the permission group 236, the nonmember 312, or a combination thereof are unpermitted to access the peripheral device 204. The virus protection 218 can deny the service request 228 to protect the peripheral device 204 from an unpermitted request.

The social network system 100 can include an execution module 522. The execution module 522 commands the peripheral device 204 registered to the social network service to perform the function requested. For example, the execution module can generate the service command 230 of FIG. 2 based on the request type 232 of the device service 202 authorized for executing the device service 202 for the peripheral device 204.

The execution module 522 can generate the service command 230 in a number of ways. For example, the service command 230 can follow the SOAP standard. The request type 232 of the device service 202 requested by the unsupported member 304 can be printing documents by the peripheral device 204. The execution module 522 can generate the service command 230 to command the peripheral device 204 for printing the documents for the unsupported member 304. For another example, the execution module 522 can execute the service command 230 to command the peripheral device 204 to activate the virus protection 218 installed in the peripheral device 204.

For illustrative purposes, the social network system 100 is shown with the visibility module 506 revealing the peripheral device 204, although it is understood that the visibility module 506 can operate differently. For example, the visibility module 506 can publish the availability 216 of the peripheral device 204 for revealing the peripheral device 204 to the nonmember 312 of the social platform 208.

For a specific example, the visibility module 506 can reveal the availability 216 of the peripheral device 204 utilizing the Open Graph Protocol™. More specifically, the visibility module 506 can reveal the availability 216 on a website unassociated with the social platform 208. For example, the visibility module 506 can publish the availability 216 on a news website, such as www.cnn.com.

For a different example, the visibility module 506 can reveal the information for the access control 234 of the permission group 236 through the social graph 206. The information can include which of the device service 202 can the permission group 236 access for the peripheral device 204.

For example, the permission group 236 formed for acquaintances of the registering member 222 can have minimal access to the peripheral device 204. The minimal access can be limited to the device service 202 for scanning only. The visibility module 506 can reveal through the social graph 206 that the permission group 236 representing the acquaintances can only access the peripheral device 204 for scanning only.

For another example, the visibility module 506 can reveal the peripheral device 204 through the social graph 206 based on the access control 234 for assuring the availability 216 of the peripheral device 204. More specifically, the acquaintances can only have the access control 234 representing faxing only. The social platform 208 can have multiple variations of the peripheral device 204, such as a printer, scanner, video player, audio player, and a fax machine. However, because the access control 234 for the acquaintance is limited to faxing, the visibility module 506 can limit the revealing of the peripheral device 204 to the acquaintances to fax machine only.

For illustrative purposes, the social network system 100 is shown with the gatekeeper module 512 generating the access control 234, although it is understood that the gatekeeper module 512 can operate differently. For example, the gatekeeper module 512 can receive the social request 314 of FIG. 3 for connecting through the social graph 206.

The nonmember 312 can send the social request 314 to the gatekeeper module 512 to establish a social relationship with the registering member 222. The gatekeeper module 512 can utilize the OAuth 2.0 Protocol™ to authorize the establishment of a social relationship between the registering member 222 and the nonmember 312.

For illustrative purposes, the social network system 100 is shown with the authorization module 520 authorizing the device service 202 through the social graph 206, although it is understood that the authorization module 520 can operate differently. For example, the authorization module 520 can authorize the device service 202 based on the social request 314 for accessing the peripheral device 204.

For a specific example, the social request 314 can provide only a limited engagement. More specifically, the social relationship that the nonmember 312 can desire to establish is for printing one document. As discussed previously, the authorization module 520 can utilize the OAuth 2.0 Protocol™ to authorize the execution of the device service 202. The authorization module 520 can authorize the device service 202 only for the one time engagement requested by the nonmember 312.

It has been discovered that the present invention provides the registering member 222 to expand the access of the peripheral device 204 to the nonmember 312 without compromising the vulnerability of the social platform 208. The ability to receive the social request 314 for a limited engagement and grant access the device service 202 to the nonmember 312 improves efficiency and productivity for utilizing the peripheral device 204 that may be idle.

The physical transformation from revealing the peripheral device 204 through the social graph 206 based on the operation of the social network system 100 results in the disclosure of the device service 202 to the non-registering member 224, the unsupported member 304, or a combination thereof. The disclosure leads to the non-registering member 224, the unsupported member 304, or a combination thereof sending the service request 228 to access the peripheral device 204. Subsequently, the social network system 100 can generate the service command 230 to command the peripheral device 204 to execute the device service 202, such as printing, scanning, faxing, displaying, or a combination thereof.

FIG. 4 can represent the hardware block diagram for implementing the social network system 100 on the second device 106 of FIG. 4. The second device 106 can include a specialized function unit to implement the social network system 100 on the hardware available of the second device 106. Each of the modules in the second device 106 can represent a hardware block for implementing the social network system 100.

FIG. 4 can represent the software block diagram for implementing the social networking system 100 on the second device 106. The first software 426 of FIG. 4 of the second device 106 of FIG. 4 can include the social network system 100. For example, the first software 426 can include the registration module 502, the grouping module 504, the visibility module 506, the monitoring module 508, the gatekeeper module 512, the request processor module 518, the authorization module 520, and the execution module 522.

The first control unit 412 of FIG. 4 can execute the first software 426 for the registration module 502 for registering the peripheral device 204. The first control unit 412 can execute the first software 426 for the grouping module 504 for generating the access combination 310. The first control unit 412 can execute the first software 426 for the visibility module 506 for revealing the peripheral device 204.

The first control unit 412 can execute the first software 426 for the monitoring module 508 for determining the device status 212, the job status 214, or a combination thereof. The first control unit 412 can execute the first software 426 for the gatekeeper module 512 for generating the access control 234. The first control unit 412 can execute the first software 426 for the request processor module 518 for determining the request type 232.

The first control unit 412 can execute the first software 426 for the authorization module 520 for authorizing the device service 202. The first control unit 412 can execute the first software 426 for the execution module 522 for generating the service command 230.

It has been discovered that the present invention provides the non-registering member 224, the unsupported member 304, or a combination thereof who has established a social relationship with the registering member 222 to access the peripheral device 204 revealed through the social graph 206 of the social platform 208. As the usage of the social platform 208 becomes integral part of the social relationship, the social network system 100 provides a hub for the registering member 222, the non-registering member 224, and the unsupported member 304 to share their resources, such as accessing the device service 202 of the peripheral device 204. The social network system 100 increases accessibility to the peripheral device 204, and improves efficiency and productivity for the members of the social platform 208.

Data generated in one module can be used by another module without being directly coupled to each other. For example, the authorization module 520 can receive the access control 234 from the gatekeeper module 512.

Figure 6:
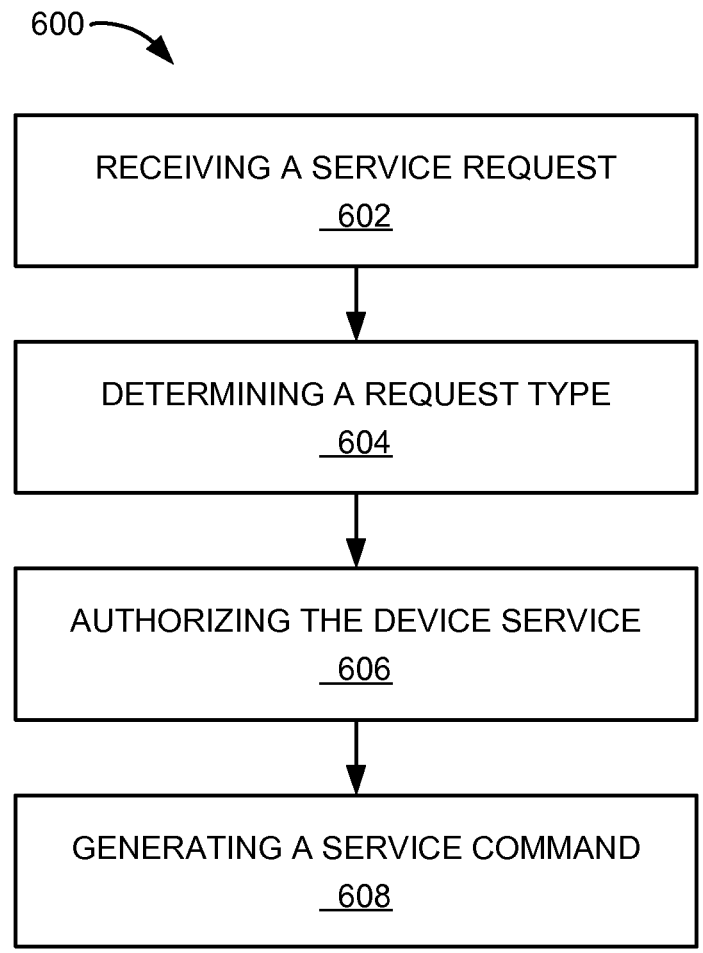
FIG. 6 is a flow chart of a method of operation of the social network system in a further embodiment of the present invention.

Referring now to FIG. 6, therein is shown a flow chart of method 600 of operation of the social network system 100 in a further embodiment of the present invention. The method 600 includes: receiving a service request for accessing a peripheral device revealed through a social graph of a social platform in a block 602; determining a request type for matching the service request to a device service provided by the peripheral device in a block 604; authorizing the device service through the social graph for accessing the peripheral device in a block 606; and generating a service command based on the request type of the device service authorized for executing the device service for the peripheral device in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a social network system comprising:
   generating with a control unit an access combination for grouping a member of a social platform and another member of a different social platform, the social platform and the different social platform each for representing a service or a site for the member and the another member building and reflecting social relations with other person, organization, or a combination thereof;
   receiving a service request for accessing a peripheral device revealed based on the access combination through a social graph of one of the social platform, the social graph for representing an existing social relationship between members within the one of the social platform;
   determining a request type for matching the service request to a device service provided by the peripheral device;
   authorizing the device service through the social graph for accessing the peripheral device; and
   generating a service command based on the request type of the device service authorized for executing the device service for the peripheral device.

2. The method as claimed in claim 1 wherein:
   generating the access combination includes generating the access combination between the social platform representing a supported social platform and the different social platform representing an unsupported social platform; and
further comprising:
   revealing the peripheral device through the social graph of the unsupported social platform based on the access combination for accessing the peripheral device via the unsupported social platform.

3. The method as claimed in claim 1 further comprising:
   determining a device status of the peripheral device;
   revealing the device status through the social graph for assuring an availability of the peripheral device; and
wherein:
   authorizing the device service through the social graph includes authorizing the device service based on the device status for accessing the peripheral device.

4. The method as claimed in claim 1 further comprising:
   determining an access control for accessing the peripheral device;
   revealing the peripheral device through the social graph based on the access control for assuring an availability of the peripheral device; and
wherein:
   authorizing the device service through the social graph includes authorizing the device service based on the access control for managing the peripheral device.

5. The method as claimed in claim 1 further comprising:
revealing a device capability of the peripheral device through the social graph; and
wherein:
authorizing the device service through the social graph includes authorizing the device service based on the device capability for accessing the peripheral device.

6. A method of operation of a social network system comprising:
generating with a control unit an access combination for grouping a member of a social platform and another member of a different social platform, the social platform and the different social platform each for representing a service or a site for the member and the another member building and reflecting social relations with other person, organization, or a combination thereof;
receiving a service request for accessing a peripheral device revealed based on the access combination through a social graph of one of the social platform, the social graph for representing an existing social relationship between members within the one of the social platform;
determining a device status for assuring an availability of the peripheral device;
determining a request type for matching the service request to a device service provided by the peripheral device;
authorizing the device service through the social graph based on the device status for accessing the peripheral device; and
generating a service command based on the request type of the device service authorized for executing the device service for the peripheral device.

7. The method as claimed in claim 6 further comprising unregistering the peripheral device from the social graph based on the device status for removing the peripheral device.

8. The method as claimed in claim 6 further comprising:
generating an access control for managing the peripheral device;
generating a permission group based on the access control for controlling the availability of the peripheral device; and
wherein:
authorizing the device service through the social graph includes authorizing the device service based on the permission group for accessing the peripheral device.

9. The method as claimed in claim 6 wherein authorizing the device service through the social graph includes executing a virus protection for protecting the peripheral device from the service request.

10. The method as claimed in claim 6 further comprising:
receiving a device registration for the peripheral device; and
wherein:
registering the peripheral device to the social platform includes registering the peripheral device based on the device registration for determining the availability of the peripheral device.

11. The method as claimed in claim 6 further comprising:
publishing the availability of the peripheral device for revealing the peripheral device to a nonmember of the social platform;
receiving a social request for connecting through the social graph; and wherein:
authorizing the device service through the social graph includes authorizing the device service based on the social request for accessing the peripheral device.

12. A social network system comprising:
a control unit configured to:
generate an access combination for grouping a member of a social platform and another member from a different social platform, the social platform and the different social platform each for representing a service or a site for the member and the another member building and reflecting social relations with other person, organization, or a combination thereof,
receive a service request for accessing a peripheral device revealed based on the access combination through a social graph of one of the social platform, the social graph for representing an existing social relationship between members within the one of the social platform,
determine a request type for matching the service request to a device service provided by the peripheral device,
authorize the device service through the social graph for accessing the peripheral device,
generate a service command based on the request type of the device service authorized, and
a communication interface, coupled to the control unit, configured to communicate the service command for executing the device service for the peripheral device.

13. The system as claimed in claim 12 wherein the control unit is configured to:
generate the access combination between the social platform representing a supported social platform and the different social platform representing an unsupported social platform; and
reveal the peripheral device through the social graph of the unsupported social platform based on the access combination for accessing the peripheral device via the unsupported social platform.

14. The system as claimed in claim 12 wherein the control unit is configured to:
determine a device status of the peripheral device;
reveal the device status through the social graph for assuring an availability of the peripheral device; and
authorize the device service based on the device status for accessing the peripheral device.

15. The system as claimed in claim 12 wherein the control unit is configured to:
determine an access control for accessing the peripheral device;
reveal the peripheral device through the social graph based on the access control for assuring an availability of the peripheral device; and
authorize the device service based on the access control for managing the peripheral device.

16. The system as claimed in claim 12 wherein the control unit is configured to:
reveal a device capability of the peripheral device through the social graph; and
authorize the device service based on the device capability for accessing the peripheral device.

17. The system as claimed in claim 12 wherein the control unit is configured to:
determine a device status for assuring an availability of the peripheral device; and
authorize the device service through the social graph based on the device status for accessing the peripheral device.

18. The system as claimed in claim 17 wherein the control unit is configured to unregister the peripheral device from the social graph based on the device status for removing the peripheral device.

19. The system as claimed in claim 17 wherein the control unit is configured to:
   generate an access control for managing the peripheral device;
   generate a permission group based on the access control for controlling the availability of the peripheral device; and
   authorize the device service based on the permission group for accessing the peripheral device.

20. The system as claimed in claim 17 wherein the control unit is configured to execute a virus protection for protecting the peripheral device from the service request.

21. The system as claimed in claim 17 wherein the control unit is configured to:
   receive a device registration for the peripheral device; and
   register the peripheral device based on the device registration for determining the availability of the peripheral device.

22. The system as claimed in claim 17 wherein the control unit is configured to:
   publish the availability of the peripheral device for revealing the peripheral device to a nonmember of the social platform;
   receive a social request for connecting through the social graph; and
   authorize the device service based on the social request for accessing the peripheral device.

* * * * *